United States Patent
Baronosky et al.

[11] Patent Number: 5,866,965
[45] Date of Patent: Feb. 2, 1999

[54] VARIABLE RELUCTANCE MOTOR HAVING FOIL WIRE WOUND COILS

[75] Inventors: Richard A. Baronosky; Peter Senak, Jr., both of Bristol; Steven H. Wollins, Glastonbury, all of Conn.

[73] Assignee: Dana Corporation, Toledo, Ohio

[21] Appl. No.: 20,232

[22] Filed: Feb. 19, 1993

Related U.S. Application Data

[63] Continuation of Ser. No. 722,349, Jun. 27, 1991, abandoned.

[51] Int. Cl.$^6$ .............................. H02K 3/04; H02K 11/00
[52] U.S. Cl. ..................... 310/208; 310/68 B; 310/168
[58] Field of Search .................... 310/168, 169, 310/89, 170, 163, 208, 90, 203, 254, 258, 68 B, 179, 180, 201, 184, 185, 194, 216, 261, 106; 318/701; 324/173, 174, 207.13, 207.25

[56] References Cited

U.S. PATENT DOCUMENTS

| | | |
|---|---|---|
| 680,795 | 8/1901 | Mallett . |
| 747,631 | 12/1903 | Osborne . |
| 1,411,393 | 4/1922 | Weichsel . |
| 2,786,416 | 3/1957 | Fenemore . |
| 2,792,512 | 5/1957 | Koch ................................. 310/258 |
| 3,287,681 | 11/1966 | Caldwell ........................... 336/192 |
| 3,292,025 | 12/1966 | Victor ................................ 310/208 |
| 3,315,199 | 4/1967 | Koch et al. ....................... 336/192 |
| 3,437,853 | 4/1969 | Arnold .............................. 310/89 |
| 3,474,370 | 10/1969 | Lightner ........................... 336/192 |
| 3,566,171 | 2/1971 | Tichy ................................ 310/184 |
| 3,700,944 | 10/1972 | Heintz ............................... 310/168 |
| 3,787,766 | 1/1974 | Greafnitz et al. ................. 336/137 |
| 3,961,417 | 6/1976 | George .............................. 29/605 |
| 4,086,552 | 4/1978 | Baggermans ...................... 336/119 |
| 4,295,268 | 10/1981 | Punshon ............................ 310/90 |
| 4,307,309 | 12/1981 | Barrett .............................. 310/166 |
| 4,348,605 | 9/1982 | Török ................................ 310/168 |
| 4,401,907 | 8/1983 | Nozawa ............................. 310/203 |
| 4,431,932 | 2/1984 | Nathenson ........................ 310/208 |
| 4,446,393 | 5/1984 | Finegold ........................... 310/208 |
| 4,453,100 | 6/1984 | Nozawa ............................. 310/205 |
| 4,670,696 | 6/1987 | Byrne ................................ 318/701 |
| 4,761,628 | 8/1988 | Nishi et al. ....................... 336/180 |

(List continued on next page.)

FOREIGN PATENT DOCUMENTS

| | | |
|---|---|---|
| 414507 | 2/1991 | European Pat. Off. . |
| 4008446 | 9/1990 | Germany . |
| 0043044 | 2/1989 | Japan ................................. 310/68 B |
| 1343413 | 1/1974 | United Kingdom . |
| 8707452 | 12/1987 | WIPO . |
| 9202982 | 2/1992 | WIPO . |

OTHER PUBLICATIONS

Practical Indirect Position Sensins For A Variable Reluctance Motor, Walter D. Harris, (no month) 1986.

*Primary Examiner*—Clayton LaBalle
*Attorney, Agent, or Firm*—MacMillan, Sobanski and Todd, LLC

[57] ABSTRACT

A variable reluctance motor is disclosed including a stator having a plurality of radially inwardly extending poles. A coil of foil wire is mounted about each of the stator poles. Flats are formed in the inner surface of the stator adjacent to the sides of each of the stator poles so that the coils of foil wire can lie flat thereagainst. A pair of rigid cylindrical retainers are provided for retaining the coils of foil wire on the poles. A rotor assembly is disposed within the stator. The rotor assembly includes a shaft having a rotor secured thereto. A plurality of radially outwardly extending poles are formed on the outer surface of the rotor. Electrical current is selectively passed through each of the coils of foil wire to cause the rotor assembly to rotate relative to the stator. Each of the coils of foil wire is wound beginning with a start winding and ending with a finish winding. The foil wires in each of the start and finish windings are employed as lead wires for connecting the coils to a control circuit for passing electrical current through the coils. A novel structure for orienting the various start and finish windings about the circumference of the stator is also disclosed.

8 Claims, 4 Drawing Sheets

U.S. PATENT DOCUMENTS

| | | | |
|---|---|---|---|
| 4,763,035 | 8/1988 | Zeeman | 310/208 |
| 4,777,419 | 10/1988 | Obradovic | 318/701 |
| 4,814,735 | 3/1989 | Williamson | 336/192 |
| 4,816,710 | 3/1989 | Silvaggio et al. | 310/194 |
| 4,818,909 | 4/1989 | Blake | 310/208 |
| 4,819,322 | 4/1989 | Higuchi et al. | 29/605 |
| 4,833,437 | 5/1989 | Williamson | 336/192 |
| 4,841,186 | 6/1989 | Feigel | 310/216 |
| 4,843,269 | 6/1989 | Shramo | 310/208 |
| 4,859,890 | 8/1989 | Sedgewick | 310/208 |
| 4,882,514 | 11/1989 | Brynsvold et al. | 310/208 |
| 4,901,084 | 2/1990 | Williamson | 336/180 |
| 4,904,973 | 2/1990 | Ikeda | 336/69 |
| 4,908,934 | 3/1990 | Ikeda | 29/827 |
| 4,967,464 | 11/1990 | Stephens | 29/596 |
| 4,972,113 | 11/1990 | Newberg | 310/89 |
| 4,975,611 | 12/1990 | Rochester | 310/194 |
| 4,982,125 | 1/1991 | Shirakawa | 310/68 B |
| 5,015,939 | 5/1991 | Konecny | 318/701 |
| 5,032,750 | 7/1991 | Hayashi | 310/68 B |
| 5,041,749 | 8/1991 | Gaser | 310/68 B |
| 5,075,610 | 12/1991 | Harris | 318/701 |
| 5,097,191 | 3/1992 | Bahn | 318/701 |

VARIABLE RELUCTANCE MOTOR HAVING FOIL WIRE WOUND COILS

This application is a continuation of Ser. No.07/722,349, filed Jun. 27, 1991, now abandoned.

BACKGROUND OF THE INVENTION

This invention relates in general to electric motors and in particular to a variable reluctance motor having coils which are wound from foil wire.

Electric motors are well known devices which convert electrical energy to rotary mechanical energy. To accomplish this, electric motors establish and control electromagnetic fields so as to cause the desired rotary mechanical motion. There are many different types of electric motors, each utilizing different means for establishing and controlling the electromagnetic fields. Consequently, the operating characteristics of these electric motors vary from type to type, and certain types of electric motors are better suited for performing certain tasks than others.

Synchronous motors constitute one principal class of electric motors. The two basic components of a synchronous motor are (1) a stationary magnetic field generating structure, generally referred to as the stator, and (2) a rotatable component driven thereby, generally referred to as the rotor. Both the stator and the rotor are usually formed from magnetic materials, such as iron. Synchronous motors are characterized in that the rotational speed of the rotor is directly related to the frequency of the electrical input signal applied thereto. Thus, so long as the frequency of the applied electrical input signal is constant, the rotor will be driven at a constant rotational speed. Within this broad definition, however, the structure and operation of synchronous electric motors vary widely.

One variety of synchronous electric motor is known as a variable reluctance (VR) motor. VR motors operate on the principle that a magnetic field surrounding a magnetic material component will exert a mechanical force on that component, urging it to become aligned with the magnetic flux lines generated by the magnetic field. Thus, by using the stator to establish and rotate a magnetic field about the rotor, the rotor can be rotatably driven to move relative to the stator. In a basic VR motor structure, this can be accomplished by providing one pair of opposed magnetic poles on the stator and a corresponding pair of opposed magnetic poles on the rotor. A coil of electrically conductive wire is wound about each of the two stator poles. By passing electrical current through each of the stator coils in an appropriate manner, the stator poles can be selectively electro-magnetized so as to attract the corresponding poles of the rotor thereto.

Frequently, two or more pairs of poles are provided on both the stator and the rotor. In this more advanced VR motor structure, electrical current is passed in sequential fashion through the stator coils so as to attract the corresponding rotor poles thereto. By providing more poles on the stator and the rotor, the overall torque generated by the VR motor can be increased. Also, the additional poles facilitate rotation of the rotor at a more uniform speed.

To further optimize the operation of the VR motor, the magnitude of the electrical current which is sequentially passed through the stator coils can be varied as a function of the rotational displacement of the rotor, as opposed to simply being supplied in an on-off manner. For example, the magnitude of the electrical current passed through a particular stator coil can initially be large, but decrease as the rotor pole rotates toward it. Consequently, the stator coil is prevented from continuing to attract that rotor pole toward it after the rotor pole has rotated past the stator pole.

As mentioned above, the electromagnetic coils used in VR motors are formed by winding electrically conductive wire about the poles of the stator. The wire used in such windings has typically been conventional wire having a circular cross sectional shape. While such wire is commonly available and relative inexpensive, the circular cross sectional shape of the wire does not lend itself to high density winding. In other words, the circular cross sectional shape of the wire causes a relatively large number of gaps to be created between adjacent turns of the wire when the coil is wound. As a result, the overall winding density (i.e., the number of windings per unit space) of the coil is limited. Since the strength of the electromagnetic field generated by the stator (for an acceptable power dissipation of the winding) is directly related to this winding density, the strength of the electromagnetic field is also limited (because of thermal considerations). Accordingly, it would be desirable to provide an improved electromagnetic coil structure for a VR motor which maximizes the overall winding density of the coil windings so as to maximize the strength of the electromagnetic field generated thereby.

SUMMARY OF THE INVENTION

This invention relates to an improved structure for a variable reluctance motor. The motor includes a stator which is generally hollow and cylindrical in shape. A plurality of radially inwardly extending poles are formed on the inner surface of the stator, each extending along the entire length thereof. A wound electromagnetic coil of foil wire is mounted about each of the stator poles. Flats are formed in the inner surface of the stator adjacent to the sides of each of the stator poles so that the coils of foil wire can lie flat there against. A pair of rigid cylindrical retainers are provided for retaining the coils of foil wire on the poles. A generally cylindrical rotor assembly is disposed within the stator. The rotor assembly includes a shaft having a rotor secured thereto. A plurality of radially outwardly extending poles are formed on the outer surface of the rotor, each extending along the entire length thereof. Electrical current is selectively passed through each of the coils of foil wire to cause the rotor assembly to rotate relative to the stator. Each of the coils of foil wire is wound beginning with a start winding and ending with a finish winding. The foil wires in each of the start and finish windings are employed as lead wires for connecting the coils to a control circuit for passing electrical current through the coils. A novel structure for orienting the various start and finish windings about the circumference of the stator is also disclosed.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
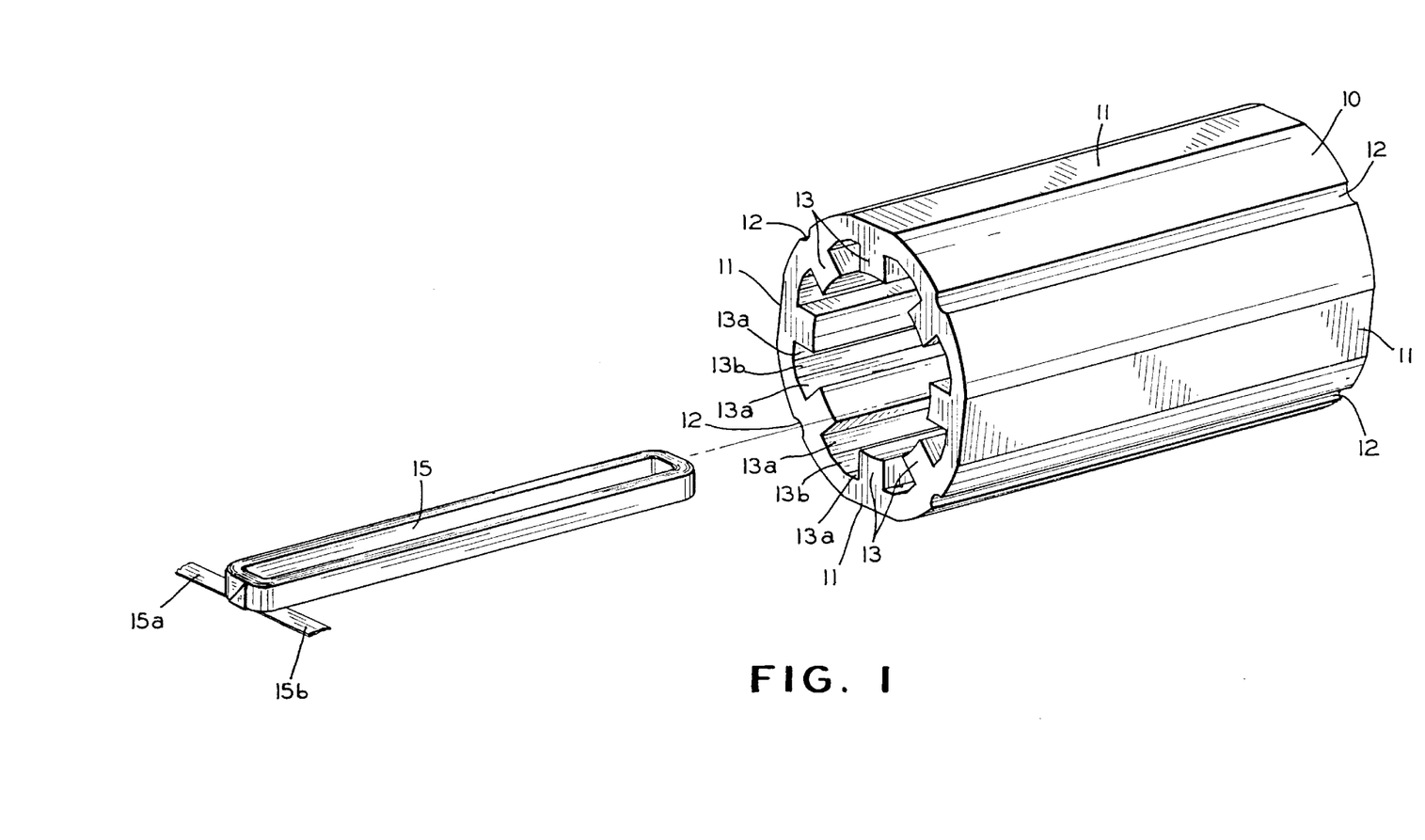
FIG. 1 is an exploded perspective view of a stator and one of a plurality of coils of foil wire to be mounted therein for a variable reluctance motor in accordance with this invention.

Referring now to the drawings, there is illustrated in FIG. 1 a stator 10 which is adapted for use in a variable reluctance (VR) motor in accordance with this invention. The illustrated stator 10 is generally hollow and cylindrical in shape, although the stator 10 may be formed in other well known shapes. A plurality of flats 11 (four in the illustrated embodiment) is formed on the outer surface of the stator 10. Between the flats 11, a plurality of longitudinally extending grooves 12 (four in the illustrated embodiment) is formed in the curved outer surface of the stator 10. The purpose for these grooves 12 will be explained below.

Figure 4:
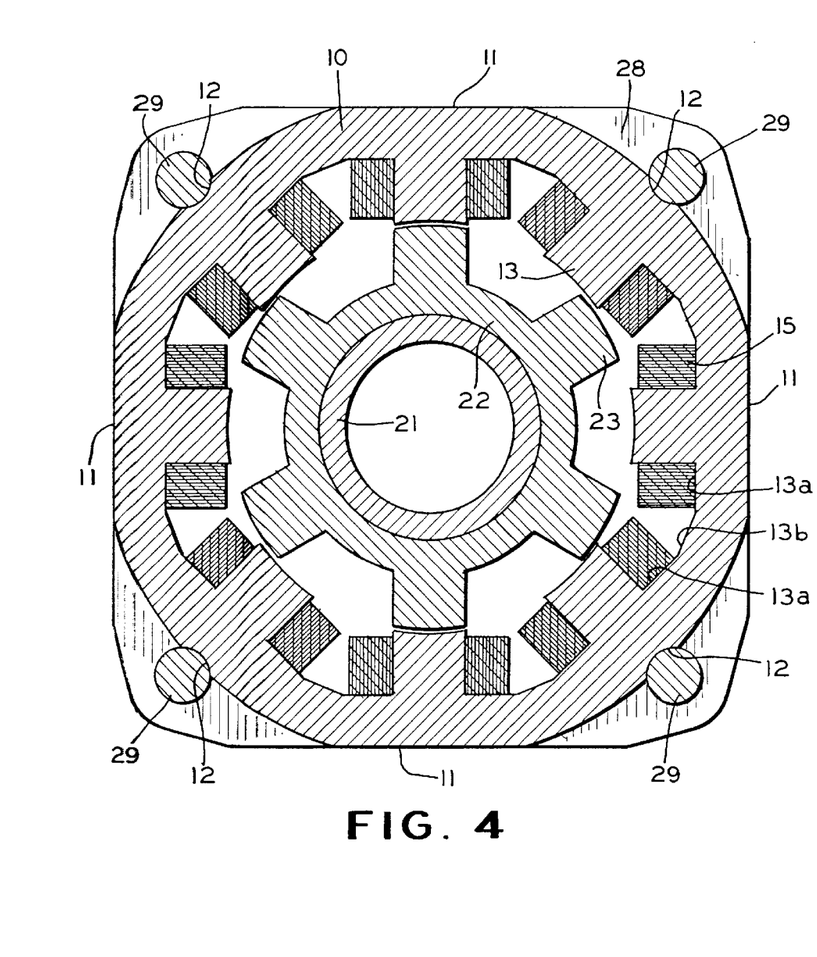
FIG. 4 is a sectional elevational view taken along line 4—4 of FIG. 3.

A plurality of poles 13 (sometimes referred to as salient poles) is formed on the inner surface of the stator 10. In the illustrated embodiment, eight of such stator poles 13 are formed on the stator 10. Each of the stator poles 13 extends radially inwardly from the inner surface of the stator 10 and is formed having a generally rectangular cross sectional shape. The stator poles 13 extend longitudinally throughout the entire length of the inner surface of the stator 10. The radially innermost surfaces of the stator poles 13 are curved so as to define an inner diameter. This inner diameter is smaller than the diameter defined by the inner surface of the stator 10 from which the stator poles 13 extend radially inwardly. As best shown in FIG. 4, a flat 13a is formed on the inner surface of the stator 10 adjacent to both sides of each of the stator poles 13. The flats 13a extend perpendicularly from the sides of the stator poles 13 and are provided for a purpose which will be explained below. Between adjacent flats 13a, intermediate portions 13b are formed on the inner surface of the stator 10.

The stator 10 is formed from a magnetic material, such as iron. The stator 10 is preferably formed by initially stamping a plurality of laminations from a relatively thin sheet of the magnetic material. Each of the laminations has a cross sectional shape which corresponds to the cross sectional shape of the stator 10. Then, the laminations are stacked on a fixture so as to be aligned with one another. Adhesive (not shown) is applied between adjacent laminations to prevent them from rotating relative to one another because of torsional forces encountered during use. The adhesive may be applied by means of a conventional vacuum process after all of the laminations have been stacked upon the fixture. Such vacuum impregnation of adhesive is also effective to reduce noise. Alternatively, the adhesive may be individually applied as the laminations are stacked upon one another on the fixture.

In either instance, the adhesive maintains the stack of laminations in alignment so that a plurality of longitudinally extending welds (not shown) can be made along the outer surface of the stack of laminations. Such welding can be performed by known electron beam techniques so as to prevent axial and torsional separation of the laminations. Alternatively, the stator 10 can be secured together by rivets, half blanking, or other conventional means. The stator 10 is preferably constructed in this laminated manner to minimize the generation of eddy currents within the stator 10, which can reduce the strength of the electromagnetic field generated thereby.

An electromagnetic coil 15 is provided for each of the poles 13 of the stator 10. As shown in FIG. 1, each coil 15 is formed from a flat strip of relatively thin insulated foil wire which is repeatedly wound about itself. The coils 15 can be formed by winding the strips of foil wire about a non-conductive insulator (not shown) supported on a mandrel (not shown) or a similar winding apparatus. The non-conductive insulators are conventional in the art and have been omitted from the drawings for clarity. Such insulators are provided to insure that there is no electrical connection between the coils 15 and the stator 10. The coil 15 is wound so as to have the same shape (although slightly larger) as the stator poles 13.

Thus, each of the foil wound coils 15 defines a hollow interior space which is slightly larger than the stator pole 13 about which it is to be mounted. It will be appreciated that each coil 15 is wound beginning with a start winding 15a and ending with a finish winding 15b. The start and finish windings 15a and 15b of each of the coils 15 are connected to an external circuit (not shown) for controlling the operation of the VR motor in a manner which will be explained in detail below.

The term "foil wire" describes a specific structure for an electrical conductor which is well known in the art. Foil wire is characterized in that its width is substantially greater than its thickness. Thus, foil wire is typically wound only in successive layers with radially increasing dimensions, with no side-by-side windings. This is contrasted with conventional wire having a circular or square cross sectional shape, wherein a number of windings are first made in side-by-side fashion before the next layer is begun. For example, it has been found acceptable to use foil wire having a width of approximately 0.320 inch and a thickness of approximately 0.010 inch. The foil wire itself is typically formed from copper and is completely covered with a thin electrical insulator coating of conventional material. It will be appreciated that foil wire having other dimensions may be used.

The thickness of the foil wire used in each of the coils 15 and, consequently, the number of windings thereof will depend upon the size of the VR motor and the particular application therefor. However, the width of the foil wire (which defines the radial dimension of the wound coil 15 when it is installed within the stator 10) is preferably equal to or slightly less than the radial dimension of the stator poles 13 about which they are to be mounted. Thus, when the coils 15 are installed within the stator 10, as shown in FIG. 2, the radial inner surfaces of the coils 15 define an inner diameter which is equal to or slightly greater than the inner diameter defined by the radial inner surfaces of the stator poles 13.

Figure 2:
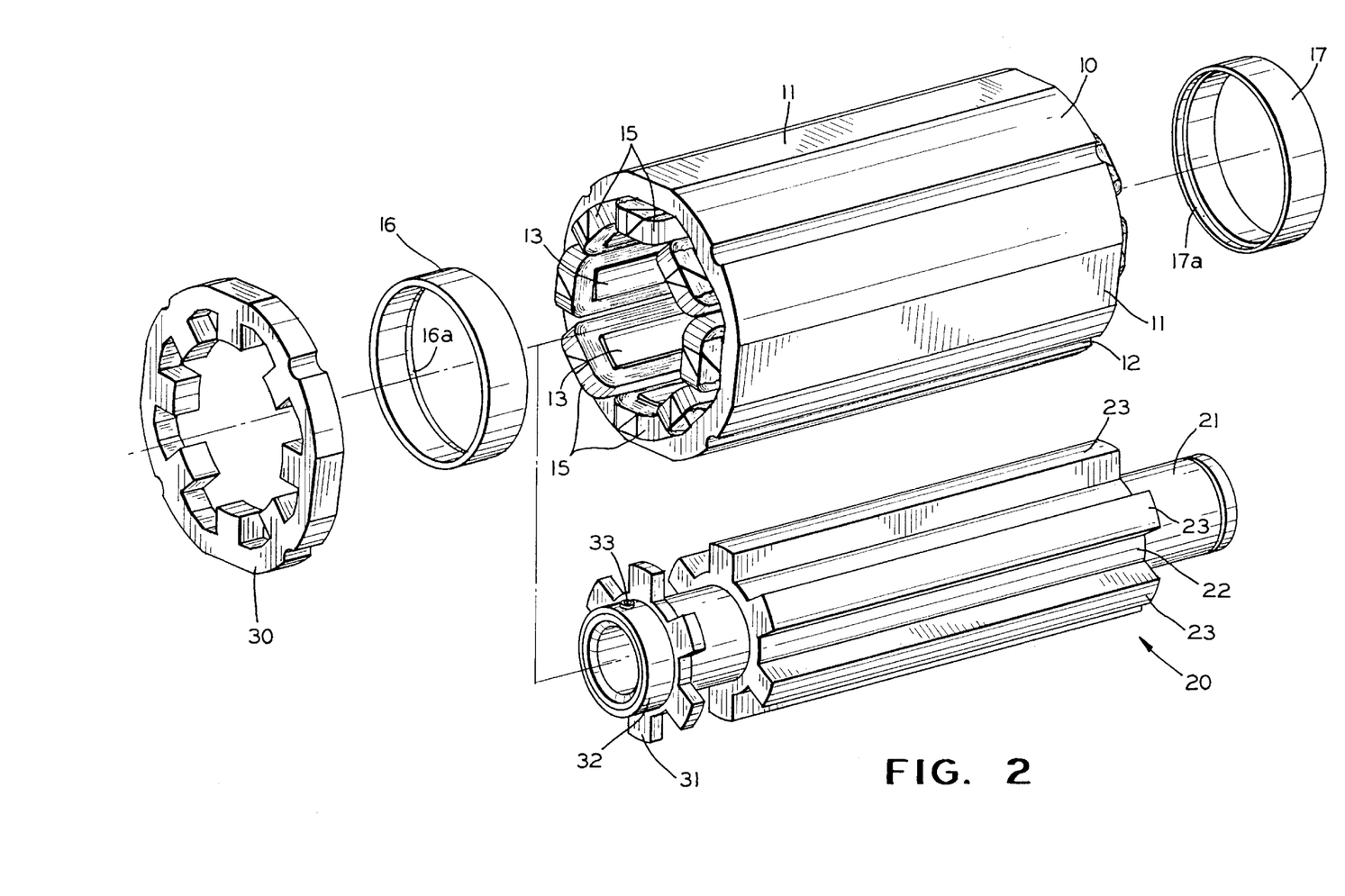
FIG. 2 is an exploded perspective view showing the coils of foil wire mounted within the stator of FIG. 1, and further showing a rotor assembly and a pair of coil retainers to be mounted therein.
Figure 3:
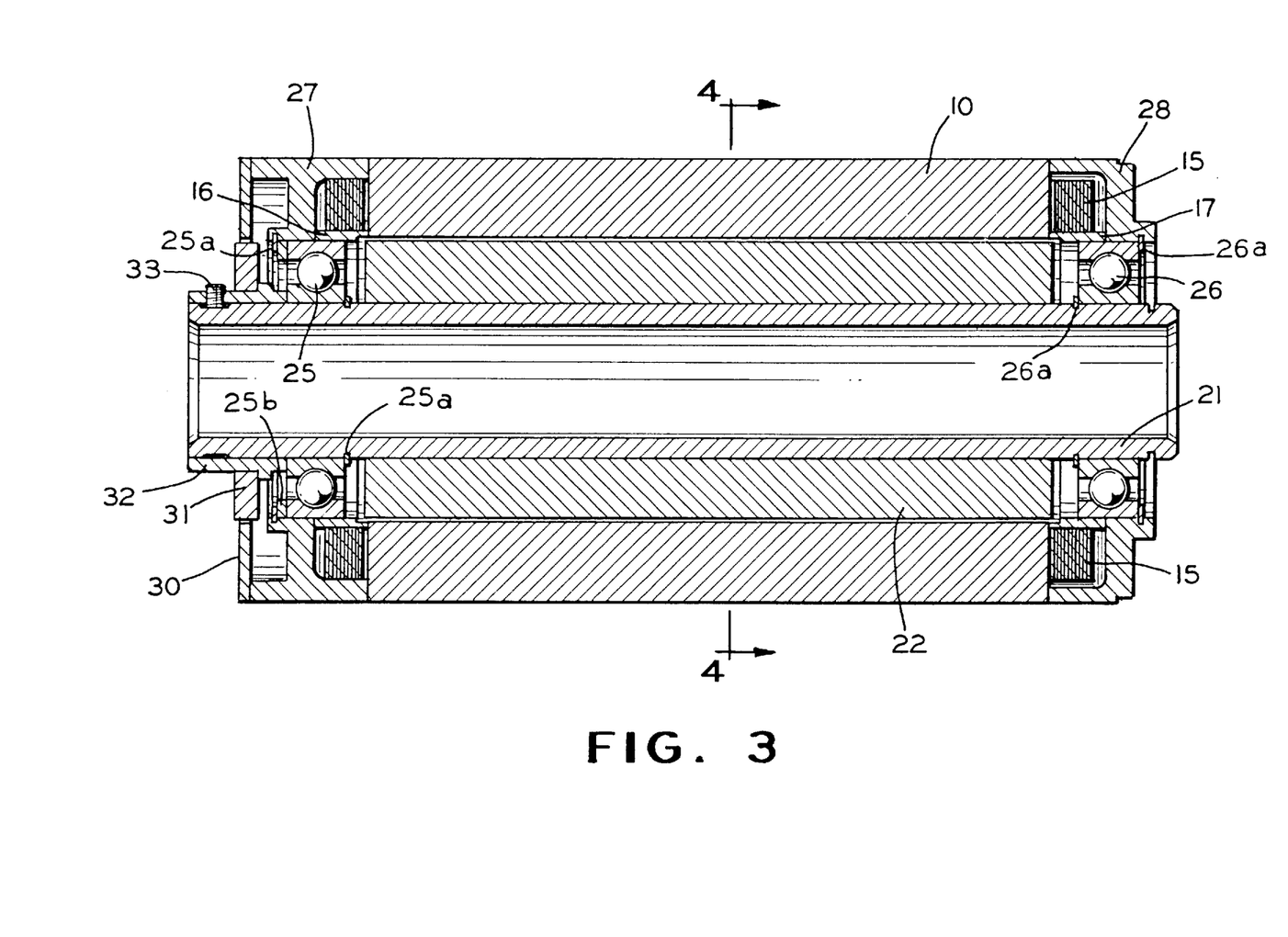
FIG. 3 is a sectional side elevational view of an assembled variable reluctance motor in accordance with this invention.

Referring now to FIG. 2, it can be seen that each of the coils 15 is mounted about each of the stator poles 13. To accomplish this, each of the coils 15 is first inserted longitudinally within the stator 10, then moved radially outwardly such that it is received over its associated stator pole 13. As mentioned above, the non-conductive insulators disposed between each of the coils 15 and the associated stator poles 13 have been omitted for clarity. Also, the start and finish windings 15a and 15b have been omitted from FIG. 2 for clarity. Means are provided for retaining the coils 15 in the position shown in FIG. 2 when the coils 15 have been installed about the stator poles 13 in this manner. As shown in FIGS. 2 and 3, such retaining means includes a pair of generally hollow cylindrical coil retainers 16 and 17. The retainers 16 and 17 are formed from any rigid non-conductive and non-magnetic material. The outer circumferential surfaces of the retainers 16 and 17 are adapted to engage the inner sides of the end portions of each of the coils 15 installed on the stator poles 13 (see FIG. 3).

To accomplish this, the outer diameters of the retainers 16 and 17 are sized to be approximately equal to the inner diameter defined by the inner sides of the coils 15. As a result, the retainers 16 and 17 can be pressed to fit snugly into engagement with the inner surfaces of the coils 15. The rigidity of the retainers 16 and 17 maintains the coils 15 in position about the stator poles 13. The inner surfaces of the retainers 16 and 17 are formed having respective recessed end portions 16a and 17a, the purpose of which will be explained below.

A motor rotor assembly, indicated generally at 20, is provided for the VR motor. The motor rotor assembly 20 includes a generally cylindrical shaft 21 which may, as shown in the illustrated embodiment, be hollow. A rotor 22 is secured to the shaft 21 for rotation therewith. As with the stator 10, the rotor 22 is formed from a magnetic material, such as iron. The shaft 21 may also be formed from the magnetic material. Alternatively, the motor rotor assembly 20 may be formed from other well known shapes. The rotor 22 is preferably formed from a plurality of laminations of relatively thin sheets of magnetic material, stamped and secured together as described above with respect to the stator 10. The rotor 22 is secured to the shaft 21 by a spline (not shown) or other means. Thus, the shaft 21 and the rotor 22 rotate together as a unit.

A plurality of poles 23 is formed on the outer surface of the rotor 22. In the illustrated embodiment, six of such rotor poles 23 are formed on the rotor 22. Each of the rotor poles 23 extends radially outwardly from the outer surface of the rotor 22 and is formed having a generally rectangular cross sectional shape. The rotor poles 23 extend longitudinally throughout the entire length of the outer surface of the rotor 22. The radially outermost surfaces of the rotor poles 23 are curved so as to define an outer diameter which is slightly smaller than the inner diameter defined by the radially innermost curved surfaces of the stator poles 13. Thus, a small air gap is defined between the stator poles 13 and the rotor poles 23.

As shown in FIGS. 3 and 4, the motor rotor assembly 20 is disposed within the stator 10 for rotation relative thereto. A pair of bearings 25 and 26 are mounted on the shaft 21 for this purpose. The bearings 25 and 26 engage and support respective end bells 27 and 28 for rotation relative to the shaft 21. The first bearing 25 is retained between the end bell 27 and the shaft 21 by a first pair of snap rings 25a. Similarly, the second bearing 26 is retained between the end bell 28 and the shaft 21 by a second pair of snap rings 26a. A wave spring 25b may be disposed between one of the snap rings 25a and the first bearing 25 to generate a preloading force on both of the bearings 25 and 26.

The two end bells 27 and 28 are secured to the opposed ends of the stator 10 by a plurality of threaded fasteners 29 (four in the illustrated embodiment), as shown in FIG. 4. The threaded fasteners 29 extend through respective apertures formed through each of the end bells 27 and 28 and through the grooves 12 formed in the outer surface of the stator 10. Thus, the stator 10 and the end bells 27 and 28 are secured together as a unit, and the motor rotor assembly 20 is rotatably mounted therein by means of the bearings 26 and 27.

As discussed above, the inner surfaces of the cylindrical coil retainers 16 and 17 are formed having respective recessed end portions 16a and 17a. These recessed end portions 16a and 17a are provided to insure there is suffi-cient clearance with the rotor poles 23. Otherwise, the rotor poles 23 might scrape against the inner surfaces of the coil retainers 16 and 17 when the motor rotor assembly 20 is rotated relative to the stator 10. As shown in FIG. 3, the coil retainers 16 and 17 are located between the stator 10 and the end bells 27 and 28, respectively, by the bearings 25 and 26.

As previously mentioned, each of the coils 15 is connected to an external circuit (not shown) which is adapted to control the operation of the VR motor. This connection is made by means of the start and finish windings 15a and 15b, respectively, in a manner which will be explained in detail below. The control circuit is conventional in the art of electric motors and forms no part of this invention. To effect control of the operation of the VR motor, the control circuit selectively causes electrical current to be passed through each of the coils 15 so to as to establish and control electromagnetic fields within the stator 10. These electromagnetic fields selectively attract the rotor poles 23 toward the stator poles 13 in a manner which is well known. As a result of these electromagnetic attractions, the motor rotor assembly 20 is caused to rotate relative to the stator 10.

Means are provided for sensing the rotational speed, direction of rotation, and angular position of the motor rotor assembly 20 relative to the stator 10. In the illustrated embodiment, such sensing means includes a sensor stator pack 30 secured to the end of the end bell 27. The sensor stator pack 30 can be formed by securing together a small number (three, for example) of the laminations used to form the stator 10. Thus, the sensor stator pack 30 is preferably formed having the same number of teeth (eight, in the illustrated embodiment) as the number of stator poles 13. Furthermore, the teeth of the sensor stator pack 30 are preferably angularly aligned with the stator poles 13. The teeth of the sensor stator pack 30 are provided with electrical conductor windings (not shown) which are connected to the control circuit by respective electrical conductors (not shown).

The sensing means further includes a sensor rotor pack 31 which, as with the sensor stator pack 30, may be formed from the same laminations used to form the rotor 22. The sensor rotor pack 31 may be mounted on a hollow cylindrical hub 32 which is secured to the shaft 21 by one or more threaded fasteners 33. As with the sensor stator pack 30, the sensor rotor pack 31 is preferably formed having the same number of teeth as the number of rotor poles 23, and such teeth are preferably angularly aligned with the rotor poles 23. Thus, when the motor rotor assembly 20 is rotated relative to the stator 10 during operation of the VR motor, the sensor rotor pack 31 rotates relative to the sensor stator pack 30. Preferably, both the stator sensor pack 30 and the rotor sensor pack 31 are magnetically isolated from the stator 10 and the motor rotor assembly 20. This can be accomplished by providing a connection therebetween which is formed from a non-ferrous material. For example, the end bell 27 and the hub 32 can be formed from aluminum, brass, or the like.

When the VR motor is assembled as shown in FIG. 3, the teeth of the sensor stator pack 30 are generally co-planar with the teeth of the sensor rotor pack 31. The inductances of the coils on each tooth of the sensor stator pack 30 are functions of the relative angular displacement between those teeth and the nearest teeth of the sensor rotor pack 31. In a manner which is well known in the art, electrical signals are developed in the coils of the sensor stator pack 30 which are functions or the inductance therein and, therefore, of the position of the motor rotor assembly 20.

When the sensor rotor pack 31 is rotated relative to the sensor stator pack 30 during operation of the VR motor, these electrical signals are fed to the control circuit through the electrical conductors. In a manner which is known in the art, the control circuit is responsive to these electrical signals for generating a signal which is representative of the rotational position and speed of the motor rotor assembly 20 relative to the stator 10. Also, the control circuit is responsive to the phase differences between the electrical signals for determining the direction of such rotation. The relative speed and angular position of the motor rotor assembly 20 can be determined by other means, such as by optical encoders, magnetic encoders, Hall effect devices, and the like.

Figure 5:
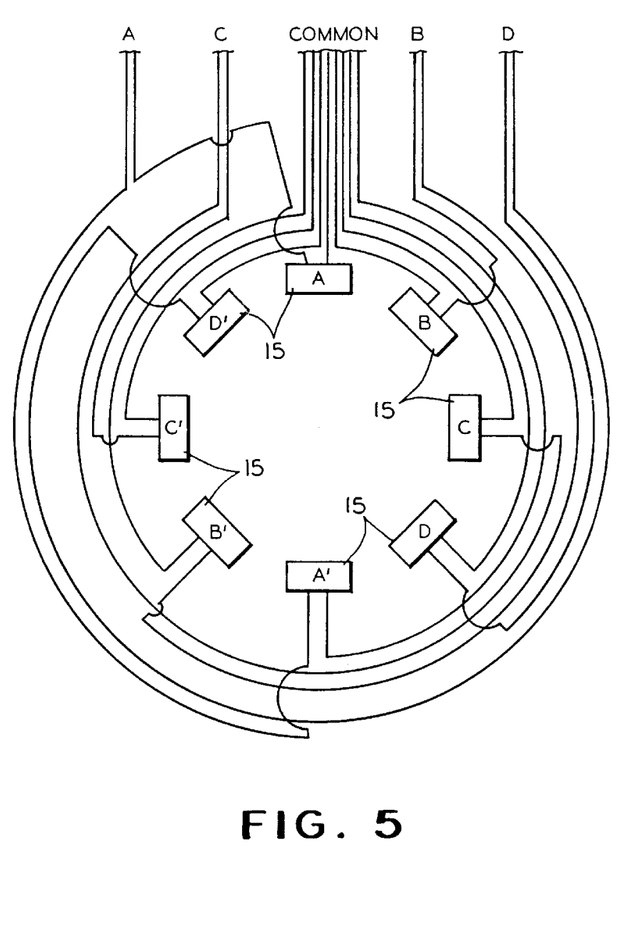
FIG. 5 is a schematic end view of the variable reluctance motor shown in FIGS. 3 and 4 showing the manner in which the various leads of the coils of foil wire are oriented about the circumference of the stator.

Referring now to FIG. 5, there is illustrated a schematic end view of the VR motor showing the manner in which the start and finish windings 15a and 15b of each of the coils 15 are oriented so as to facilitate the connection thereof to the control circuit. The coils 15 are identified in opposed pairs by letters, namely, A and A', B and B', C and C', and D and D'. Thus, the four pairs of coils 15 define four phases which can be selectively energized to cause rotation of the motor rotor assembly 20. It will be appreciated that because of the symmetry of the stator 10 and the rotor 22, the opposed pairs of coils 15 (A and A', for example) can be connected to the control circuit so as to be concurrently energized.

As shown in FIG. 5, the start and finish windings 15a and 15b are folded about the ends of each of the coils 15 so as to extend circumferentially about the ends thereof. One of the start and finish windings 15a and 15b, respectively, from each of the coils 15 is connected to a common or electrical ground line. The remaining start and finish windings 15a and 15b, respectively, from each of the coils 15 are connected to the control circuit four pairs, each pair being composed of a start or finish winding from the opposed coils. The pairs of coils 15 may be connected either in parallel or in series. In either instance, the same amount of electrical current is passed through each of the coils 15 in the opposed pairs. Consequently, the electromagnetic field generated by each of the coils 15 in the opposed pairs is the same.

Thus, as discussed above, the control circuit selectively causes electrical current to be passed through each of the coils 15 to as to establish and control electromagnetic fields within the stator 10. These electromagnetic fields selectively attract the rotor poles 23 toward the stator poles 13 in a manner which is well known. As a result of these electromagnetic attractions, the motor rotor assembly 20 is caused to rotate relative to the stator 10. By orienting the various start windings 15a and finish windings 15b of the coils 15 circumferentially about the ends thereof, efficient use is made of the available physical space for connecting the coils 15 to the control circuit.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A variable reluctance electric motor comprising:
   a stator formed from a magnetic material, said stator being generally hollow and cylindrical in shape and having an inner surface, said stator having a plurality of inwardly extending poles formed thereon which extend longitudinally throughout said inner surface, each of said stator poles having a pair of sides, said stator being formed having a flat which extends from each of said sides of said stator poles;

a rotor formed from a magnetic material, said rotor being generally cylindrical in shape and having an outer surface, said rotor having a plurality of outwardly extending poles formed thereon which extend longitudinally throughout said outer surface;

means for supporting said rotor for rotation within said stator; and a coil of foil wire disposed about each of said stator poles against said flats, said coils adapted to be connected to a control circuit for selectively passing electrical current therethrough so as to cause each of said coils to generate an electromagnetic field, said electromagnetic fields selectively attracting said rotor poles toward said stator poles so as to cause said rotor to rotate relative to said stator.

2. The invention defined in claim 1 wherein said flats extend perpendicularly from said sides of said poles.

3. A variable reluctance electric motor comprising:
   a stator formed from a magnetic material, said stator being generally hollow and cylindrical in shape and having an inner surface, said stator having a plurality of inwardly extending poles formed thereon which extend longitudinally throughout said inner surface;

a rotor formed from a magnetic material, said rotor being generally cylindrical in shape and having an outer surface, said rotor having a plurality of outwardly extending poles formed thereon which extend longitudinally throughout said outer surface;

means for supporting said rotor for rotation within said stator;

a coil of foil wire disposed about each of said stator poles, said coils adapted to be connected to a control circuit for selectively passing electrical current therethrough so as to cause each of said coils to generate an electromagnetic field, said electromagnetic fields selectively attracting said rotor poles toward said stator poles so as to cause said rotor to rotate relative to said stator; and means for sensing the rotational position of said rotor relative to said stator, said means for sensing including a stator sensor pack secured to said stator and a rotor sensor pack secured to said rotor, wherein said stator sensor pack is formed having a plurality of teeth and said rotor sensor pack is formed having a plurality of teeth.

4. The invention defined in claim 3 wherein said stator sensor pack teeth are angularly aligned with said stator poles and said rotor sensor pack teeth are angularly aligned with said rotor poles.

5. The invention defined in claim 3 wherein said stator sensor pack teeth are oriented so as to be co-planar with said rotor sensor pack teeth.

6. The invention defined in claim 3 wherein said plurality of poles formed on said stator is equal in number to said plurality of teeth formed on said stator sensor pack.

7. The invention defined in claim 3 wherein said plurality of poles formed on said rotor is equal in number to said plurality of teeth formed on said rotor sensor pack.

8. A variable reluctance electric motor comprising:
   a hollow stator formed from a magnetic material, said stator having a plurality of inwardly extending poles formed thereon;

a rotor formed from a magnetic material, said rotor having a plurality of outwardly extending poles formed thereon;

means for supporting said rotor for rotation within said stator; and a coil disposed about each of said stator poles, said coils adapted to be connected to a control circuit for selectively passing electrical current therethrough so as to cause each of said coils to generate an electromagnetic field, said electromagnetic fields selectively attracting said rotor poles toward said stator poles so as to cause said rotor to rotate relative to said stator;

a stator sensor pack secured to said stator, said stator sensor pack having a plurality of inwardly extending teeth formed thereon;

a rotor sensor pack secured to said rotor for rotation therewith relative to said stator sensor pack, said rotor sensor pack having a plurality of outwardly extending teeth formed thereon; and means responsive to the relative positions of said teeth of said stator sensor pack and said teeth of said rotor sensor pack for generating a signal representative thereof.

\* \* \* \* \*